United States Patent
Borelli et al.

(10) Patent No.: US 12,404,058 B2
(45) Date of Patent: Sep. 2, 2025

(54) ENHANCING PACKAGE FORMATION IN A FOOD PACKAGING SYSTEM BASED ON REINFORCEMENT LEARNING

(71) Applicant: Tetra Laval Holdings & Finance S.A., Pully (CH)

(72) Inventors: Gabriele Borelli, Spilamberto (IT); Stefano Fornasari, Modena (IT)

(73) Assignee: Tetra Laval Holdings & Finance S.A., Pully (CH)

( * ) Notice: Subject to any disclaimer, the term of this patent is extended or adjusted under 35 U.S.C. 154(b) by 0 days.

(21) Appl. No.: 18/257,859

(22) PCT Filed: Dec. 17, 2021

(86) PCT No.: PCT/EP2021/086364
§ 371 (c)(1),
(2) Date: Jun. 15, 2023

(87) PCT Pub. No.: WO2022/129448
PCT Pub. Date: Jun. 23, 2022

(65) Prior Publication Data
US 2024/0067376 A1    Feb. 29, 2024

Related U.S. Application Data

(60) Provisional application No. 63/126,858, filed on Dec. 17, 2020.

(51) Int. Cl.
*B65B 9/213* (2012.01)
*B65B 3/00* (2006.01)
(Continued)

(52) U.S. Cl.
CPC ............. *B65B 41/16* (2013.01); *B65B 3/00* (2013.01); *B65B 3/26* (2013.01); *B65B 9/20* (2013.01);
(Continued)

(58) Field of Classification Search
USPC .......................................................... 53/451
See application file for complete search history.

(56) References Cited

U.S. PATENT DOCUMENTS

| 5,148,841 A | 9/1992 | Graffin et al. |
| 6,397,557 B1 * | 6/2002 | Bassissi .................. B29C 53/54 |
| | | 53/550 |

(Continued)

FOREIGN PATENT DOCUMENTS

| CN | 10-9626082 A | 4/2019 |
| EP | 0 614 809 A2 | 9/1994 |

(Continued)

OTHER PUBLICATIONS

International Search Report and Written Opinion in PCT/EP2021/086364 mailed on Apr. 14, 2022 in 8 pages.

(Continued)

*Primary Examiner* — Chinyere J Rushing-Tucker
(74) *Attorney, Agent, or Firm* — Knobbe Martens Olson & Bear LLP

(57) ABSTRACT

Methods and apparatus described for forming individual packages in a food packaging machine comprising a plurality of sub-systems. One or more local variable values are received, which indicate measurements by the food packaging machine of one or more physical parameters for a local sub-system. One or more remote variable values are received, which indicate measurements by the food packaging machine of one or more physical parameters for one or remote sub-systems. One or more control parameter values are determined for the local sub-system of the food packaging machine, by processing the remote variable values and the local variable values using a reinforcement learning model and a local control model. One or more control parameters of the local sub-system are adjusted in accordance with the determined control parameter values.

(Continued)

The formation of individual packages by the food packaging machine is controlled in accordance with the adjusted one or more control parameters.

17 Claims, 2 Drawing Sheets

(51) Int. Cl.
| | |
|---|---|
| *B65B 3/26* | (2006.01) |
| *B65B 9/20* | (2012.01) |
| *B65B 37/00* | (2006.01) |
| *B65B 41/16* | (2006.01) |
| *B65B 43/08* | (2006.01) |
| *B65B 43/42* | (2006.01) |
| *B65B 51/14* | (2006.01) |
| *B65B 57/00* | (2006.01) |
| *B65B 57/02* | (2006.01) |
| *B65B 57/04* | (2006.01) |
| *B65B 57/14* | (2006.01) |
| *B65B 59/00* | (2006.01) |
| *B65H 23/04* | (2006.01) |
| *B65H 23/188* | (2006.01) |
| *G05B 13/02* | (2006.01) |

(52) U.S. Cl.
CPC .............. *B65B 9/213* (2013.01); *B65B 37/00* (2013.01); *B65B 43/08* (2013.01); *B65B 43/42* (2013.01); *B65B 51/146* (2013.01); *B65B 57/00* (2013.01); *B65B 57/02* (2013.01); *B65B 57/04* (2013.01); *B65B 57/145* (2013.01); *B65B 59/003* (2019.05); *B65H 23/048* (2013.01); *B65H 23/1888* (2013.01); *G05B 13/024* (2013.01); *G05B 13/027* (2013.01); *B65B 2210/04* (2013.01); *B65H 2511/112* (2013.01); *B65H 2557/24* (2013.01); *B65H 2557/264* (2013.01); *B65H 2801/69* (2013.01)

(56) References Cited

U.S. PATENT DOCUMENTS

| | | |
|---|---|---|
| 6,732,496 B1 | 5/2004 | Wessman et al. |
| 7,827,768 B2 | 11/2010 | Rosberg et al. |
| 10,343,803 B2 | 7/2019 | Scarabelli et al. |
| 10,399,724 B2 | 9/2019 | Aiello et al. |
| 2007/0017189 A1 | 1/2007 | Konno |
| 2008/0302066 A1 | 12/2008 | Lavi |
| 2009/0178728 A1 | 7/2009 | Cochran et al. |
| 2019/0196417 A1 | 6/2019 | Uno |
| 2019/0241297 A1 | 8/2019 | Brenkus |
| 2020/0250109 A1 | 8/2020 | Yaavoc et al. |
| 2020/0299120 A1 | 9/2020 | Bhaskar et al. |

FOREIGN PATENT DOCUMENTS

| | | |
|---|---|---|
| EP | 0 950 608 A1 | 10/1999 |
| EP | 3 725 689 A1 | 10/2020 |
| EP | 3 741 690 A1 | 11/2020 |
| JP | H0736506 A | 2/1995 |
| JP | 200033914 | 2/2000 |
| JP | 2001-253405 A | 9/2001 |
| JP | 2019117458 | 7/2019 |
| WO | WO2005035368 A1 | 4/2005 |
| WO | WO 2019/188931 A1 | 10/2019 |

OTHER PUBLICATIONS

Office Action with Search Report received in corresponding Chinese patent application No. 202180083798.9 dated May 1, 2025.

\* cited by examiner

ENHANCING PACKAGE FORMATION IN A FOOD PACKAGING SYSTEM BASED ON REINFORCEMENT LEARNING

TECHNICAL FIELD

The invention relates to food packaging systems, and more specifically to controlling how individual packages are formed in food packaging systems.

BACKGROUND

Automation control systems are used in a wide range of manufacturing and processing settings today and have continuously grown in complexity. A common approach for managing this complexity is to divide the system into sub-systems and develop suitable control mechanisms for each sub-system. However, this approach does not always result in an optimal solution for the system as a whole.

Capturing influencing factors from different sources becomes increasingly difficult as a system gets more complex and the number of influencing factors grows. This complexity further increases when the relationships between influencing factors, control variables and the system itself are non-linear and/or difficult to model.

With regards to the level of abstraction in industrial control, two main perspectives can be taken: low level control and high level control, respectively. Low level control implies the management of individual automation components (e.g., actuators, servo motors, heaters and many other devices). High level control can grow in abstraction going from a sub-system level, to a system level, and further to the orchestration of an entire plant with multiple systems and sub-systems that need to operate in concert.

As an example, food processing and packaging equipment typically includes several sub-systems, such as a filling system, a sterilizing system, a package folding system, etc. Each sub-system contains a number of different elements (e.g., pneumatic actuators, servo motors, DC motors, AC motors, sensors, other actuators, etc.). These individual elements are typically controlled by a low level, local control system that exploits conventional control techniques, such as Proportional Integral Derivative (PID) controllers, to control a target variable. A feedback loop is used to keep the error of the controller low with respect to a target working point of the element, system, or sub-system.

However, PID controllers need to be tuned for their specific application and are usually optimized for a specific working range and working dynamics. They are also not very well suited to adapt to unforeseen circumstances or working conditions that are outside of their conventional working zone. When such conditions change (e.g., different working environment, changes in the automation element, changes in the manufacturing process, etc.) the parameters of the PID controller often need to be tuned and re-calibrated. This can be a time-consuming and complex process that requires significant manual input from experienced personnel, especially when a large number of elements and/or sub-systems are involved, such as is typically the case in food processing and packaging equipment.

A filling machine is an example of a complex system that packages liquid, semi-liquid or pourable food products, such as fruit juice, UHT (ultra-high temperature treated) milk, wine, tomato sauce, etc., into composite packages made of a multilayer composite packaging material for distribution and sale. A typical example is the parallelepiped-shaped package for pourable food products known as Tetra Brik Aseptic™, which is made by sealing and folding a laminated strip packaging material. The packaging material has a multilayer structure comprising a carton and/or paper base layer, covered on both sides with layers of heat-seal plastic material, e.g. polyethylene. In the case of aseptic packages for long-storage products, the packaging material also includes a layer of oxygen-barrier material, e.g. an aluminum foil, which is superimposed on a layer of heat-seal plastic material, and is in turn covered with another layer of heat-seal plastic material forming the inner face of the package eventually contacting the food product.

The filling machine starts from a web of multilayer composite packaging material (wound from a reel). The web is fed through the filling machine, wherein a tube is formed from the web by producing a longitudinal sealing. The liquid food product is fed into the tube via a pipe; a lower end of the tube is then fed into a folding device, in which a transversal sealing is produced, the tube being folded according to folding lines, also referred to as weakening lines, and then cut off such that the composite packages filled of the liquid food product are formed.

The machine module or sub-system in charge of package forming, transversal sealing and cutting is referred to as a "jaw system", and is composed of a couple of jaw pairs whose synchronized movements allow pulling down the packaging material tube and fully closing a filled package. The jaw system is an important part of the filling machine, since the coordinated motion of the two jaw pairs is responsible for the correct shaping of packages. Moreover, the jaws must move upward and downward without interfering with each other and must remain closed for a given time interval, to allow the sealing system to complete its task. At the same time, the system should be designed and controlled in order to adapt its motion profiles according to the volume and size of the different package formats, in order to increase the flexibility of the machine.

If the jaw system's movement is not precisely controlled, misalignments may occur between the design on the packaging material and the sealing and cutting processes in the jaw system, which may result both in an aesthetically unpleasing appearance, and in folding and integrity issues of the packaging material. Further, even if the jaw system in itself can be well controlled as a sub-system, there may be events during the packaging process (e.g., splice events (i.e., when a tail end of packaging web on a used roll of packaging web, at the beginning of the food packaging machine, is joined with a front end of packaging web of a fresh roll of packaging web to create a continuous packaging web, thus creating a section of web having a thickness of two layers instead of a single layer), acceleration, deceleration, stops, package format change, food product change, etc.) which can influence the robustness of the low-level control, and result in misalignments between the design on the packaging material and the sealing and cutting processes in the jaw system. Thus, there is a need for enhance control techniques that also takes into account events that occur outside the jaw system itself and which may affect the formation of individual packages.

SUMMARY

It is an object of the invention to at least partly overcome one or more limitations of the prior art. In particular, it is an object to provide methods and systems that make it possible to control a local sub-system of a food packaging machine (e.g., a jaw system), by taking into account measured parameter values not only for the local sub-system itself, but also for other, remote, sub-systems in the food packaging machine. As a result, improved formation of individual packages can be accomplished.

In one aspect of the invention, this is achieved by a method for forming individual packages in a food packaging machine, wherein the food packaging machine comprises a plurality of sub-systems. The method includes:

receiving one or more local variable values indicating measurements by the food packaging machine of local one or more physical parameters for a local sub-system;

receiving one or more remote variable values indicating measurements by the food packaging machine of one or more physical parameters for one or remote sub-systems;

determining one or more control parameter values for the local sub-system of the food packaging machine, by processing the remote variable values and the local variable values using a reinforcement learning model and a local control model;

adjusting one or more control parameters of the local sub-system in accordance with the determined control parameter values; and controlling the formation of individual packages by the food packaging machine in accordance with the adjusted one or more control parameters.

The exploitation of both local variables and inputs from remote sub-systems will results in a more precisely controlled package forming process and a more resilient operation when unexpected events occur in the food packaging machine. This results in fewer wasted packages (and food product), and thus more efficient and environmentally friendly operation of the food packaging machine. Given the ability to better control the package forming process, shorter time to market for new products and/or configurations is also made possible as less manual testing is needed. This is further enhanced as control policies can be learned in simulated environment, such that the food packaging machine does not need to be manually configured "from scratch."

In one embodiment, the reinforcement learning model is a deep reinforcement learning model including a neural network. Deep reinforcement learning is particularly useful when evolving control policies for sub-systems that must consider a large number of variables whose internal relations and effects on the sub-system may not be known, and presents a more sophisticated approach to determining the one or more control parameter values for the local sub-system of the food packaging machine than what might be possible using conventional reinforcement learning without a neural network.

In one embodiment, the local sub-system is a jaw-system configured to form individual packages from a tube of packaging material filled with a food product. The jaw system is a common sub-system in many conventional food packaging machines. Having the ability to deploy the various embodiments of the invention into existing food packaging machines and systems enhances the versatility of the invention.

In one embodiment, adjusting one or more control parameters of the jaw-system includes adjusting a timing of the sealing jaws' engagement with the tube of packaging material to form individual packages, and/or a position of a sealing jaws' engagement with the tube of packaging material to form individual packages. These are two important operations, each of which is very important and needs to be controlled with utmost accuracy, to correctly form individual packages. Thus, having improved control over these parameters, as is accomplished by the data-driven approach of the various embodiments described herein, significantly enhances the operation of the jaw system, and thus the individual package formation.

In one embodiment, the neural network is a convolution neural network, a recurrent neural network, a Long Short-Term Memory neural network, or a fully connected neural network. These are all different types of conventional neural networks that are well known to those having ordinary skill in the art and are thus more easily incorporated into existing food packaging machine settings.

In one embodiment, the one or more local variables include measurements relating to synchronization marks printed on the packaging web, a jaw system motion profile, or a status for mechanical forming adjustment tools, and the one or more remote variable values include measurements relating to packaging web movement and control variables, packaging web tension variables, packaging filling state variables, and packaging material. These are all different categories of variables that are used in various combinations in different food packaging machines. By using neural networks, it is possible to accommodate any individual variables (or combinations thereof) that fall into these categories, which greatly increases the flexibility of the system.

Other aspects of the invention include a system and a computer program for forming individual packages in a food packaging machine. The features and advantages of these aspects of the invention are substantively the same as those discussed above for the method.

Still other objectives, features, aspects and advantages of the invention will appear from the following detailed description as well as from the drawings.

DRAWINGS

Embodiments of the invention will now be described, by way of example, with reference to the accompanying schematic drawings.

DETAILED DESCRIPTION

Figure 1:
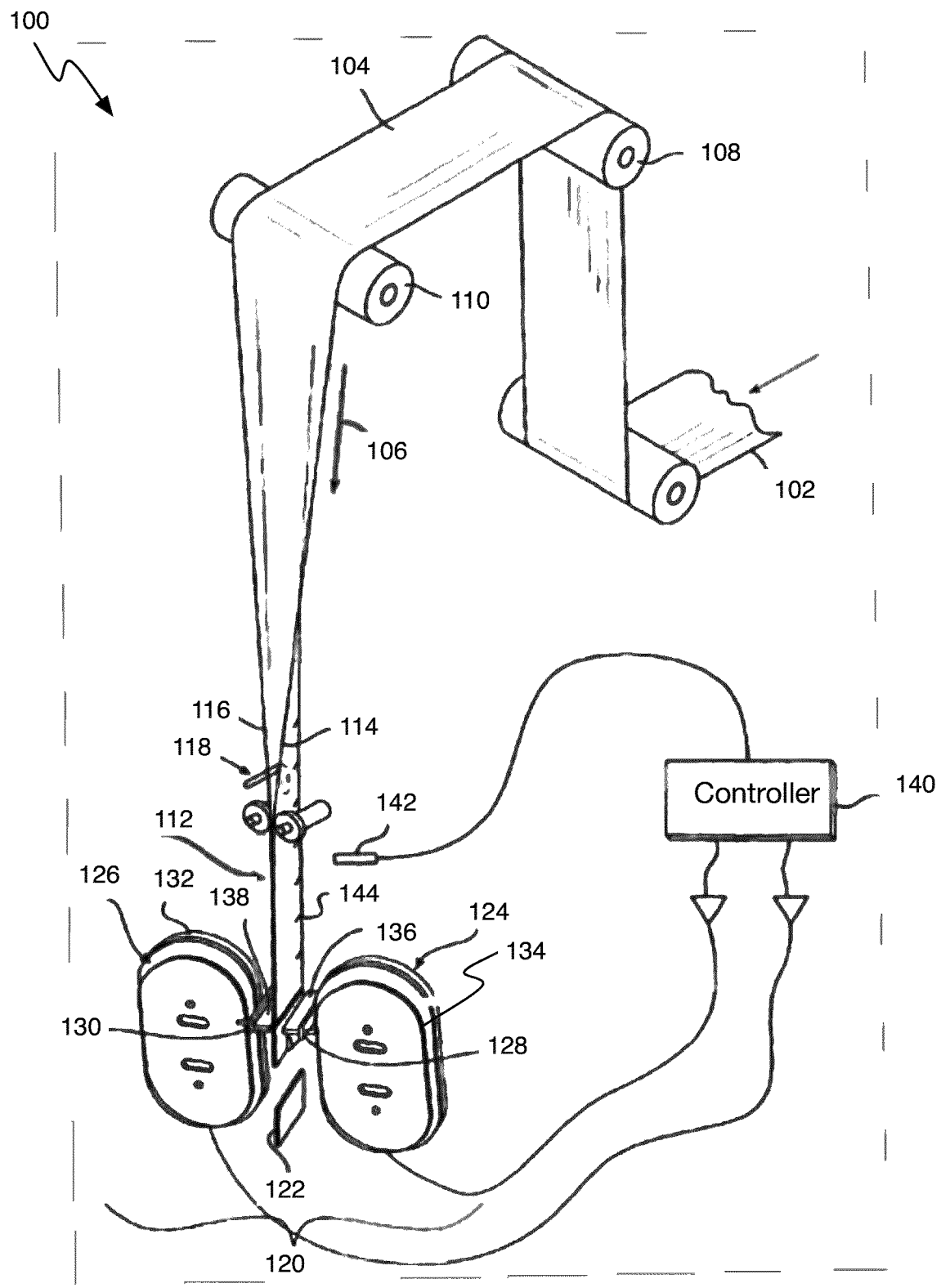
FIG. 1 is a schematic diagram of a portion of a food packaging machine, in accordance with one embodiment.

As was mentioned above, a goal with the various embodiments of the invention is to provide improved control techniques for equipment and systems relating to food processing and packaging, and in particular with respect to forming individual packages by the food packaging machine. Having correctly formed packages is important, not only from design and aesthetics point of view, but also from a functionality point of view, as very small inaccuracies in the formation of the individual packages may impact the functionality of the package. For some packages, very precise accuracy (typically at a sub-millimeter level) is required. By applying the general concepts of reinforcement learning and/or deep reinforcement learning techniques to control the jaw system, misalignments (e.g., between the design on the packaging material and the sealing and cutting processes in the jaw system) can be corrected at a very precise level.

Both reinforcement learning and deep reinforcement learning are examples of machine learning techniques. In general, reinforcement learning (RL) can be characterized as dynamically learning through the use of positive or negative rewards. A system performance is evaluated with respect to a desired target. If the target is reached or not, a positive reward is delivered, and if the target is not reached, a negative reward is delivered. As the positive and negative rewards accumulate over time, the RL model evolves a control policy for the system, with the goal of maximizing the outcome. Deep reinforcement learning (DRL) can be characterized as an enhancement of RL, in which RL is used together with a neural network when evolving the control policy for the system.

In the context of food processing and packaging, RL (i.e., agent-environment interaction) can be used to evolve a control policy for a food processing and/or packaging machine. Using DRL (i.e., RL together with a neural network) can be particularly useful when evolving control policies for sub-systems, such as the filling sub-system, that must consider a large number of variables whose internal relations and effects on the sub-system may not be known. In addition, it should be noted that RL and DRL techniques can also be used to improve existing, local control techniques, in essence by "filling in the gaps" of conventional control techniques with this data-driven approach. Thus, the DRL algorithm can then directly (or indirectly through other control layers, e.g., by tuning the gains of a conventional PID controller to allow the PID controller to operate more efficiently compared to the conventional control techniques) control the actuators (e.g., servomotors, pneumatic actuators or other actuators) that control how individual packages are formed in a food packaging system.

In order to further illustrate these principles, various embodiments of the invention will now be described more fully by way of example of controlling a jaw sub-system in a food packaging machine to perform alignment correction throughout the food packaging machine, and with reference to the accompanying drawings in which some, but not all, embodiments of the invention are shown. The invention may be embodied in many different forms and should not be construed as limited to the embodiments set forth herein.

As was mentioned above, the jaw system is an important sub-system of a food packaging machine, and its operation needs to be precisely controlled in order to comply with the design of the packaging material, and to properly form the individual packages. A misaligned design may result in folding and integrity issues of the packaging material.

FIG. 1 shows a schematic view of a food packaging machine 100, where a web 102 of packaging material, which preferably includes at least one sealable surface 104 thereon, is fed forwardly 106 through a web feeder over guide rolls 108, 110 and formed into a tube 112. The longitudinally overlaid side edges 114, 116 of the web 102 are sealed to close the tube along the longitudinal edge thereof. The side edges may be overlaid either with the undersides against each other or overlapped with the undersides facing in the same direction. A strip of tape (not shown) may be provided along one or both of the longitudinal edges 114, 116 to assist in tube formation.

A food product is fed into the formed tube from a food product filling device via a food product pipe 118 placed at least partly inside the formed tube. Food product in this context refers to anything that people or animals ingest, eat and/or drink or that plants absorb, including but not limited to liquid, semi-liquid, viscous, dry, powder and solid food products, drink products, and water. For the avoidance of doubt, food products also include ingredients for preparing food. Some examples of food products include milk, water and juice. The filled tube is then forwarded to a jaw sub-system 120, where the transverse seals of the package 122 are formed at, preferably, equally spaced apart locations along the length of the tube, although non-equal lengths may also be formed if so desired. Sealing may occur by heat or other known means. After the tube is sealed, it is severed transversely of its length and within the bounds of the transversely sealed areas to form individual packages filled with the product. Commonly, where equal sized packages are produced, each of the packages is filled with a consistent volume of product. In food packaging machines, in particular, consistency of volume is provided by making the individual packages of equal volume when sealed. Thus, the individual transverse seals are preferably formed at equally spaced apart locations along the length of the web.

In a preferred embodiment of the food packaging machine depicted in FIG. 1, the jaw sub-system 120 includes first and second sealing jaw subassemblies 124 and 126, respectively, which are disposed on opposite sides of the tube. These subassemblies 124, 126 include at least one carriage 128, 130 and preferably a plurality of carriages. The carriages 128, 130 are preferably mounted on respective tracks 132, 134 along closed loop paths. Alternatively, the carriages may be mounted on open loop paths. Preferably, instead of varying the velocity of the web 102, the positioning of the carriages 128, 130 and their associated sealing jaws 136, 138 is controlled by a controller 140, or other controlling mechanism, to ensure that each pair of sealing jaws 136, 138 registers with the appropriate portion of the tube at a preselected location. This serves to ensure proper package 122 size.

The controller 140 receives input from a registration sensor 142, such as an optical sensor that is capable of optically detecting synchronization marks 144, which are provided at spaced intervals on the packaging web. The synchronization marks 144 are constructed in such a way that there is little chance that the registration sensor 142 will misread them. For example, they may have high contrast with the background and/or have an easily recognizable shape. One example of a synchronization mark 144 is a UPC (Universal Product Code) bar code. In some embodiments, the registration sensor 142 may be an infrared or fluorescent ink sensor or a proximity probe, or any other type of position sensing device, such as a sensor capable of detecting magnetic ink.

In addition, the controller also receives input from remote, sub-systems of the food packaging machine 100, which may experience events that may have an effect on the operation of the local jaw sub-system. Some examples of such events may include splice events; acceleration, deceleration or stops of the packaging web; package format change; product change, etc.

Figure 2:
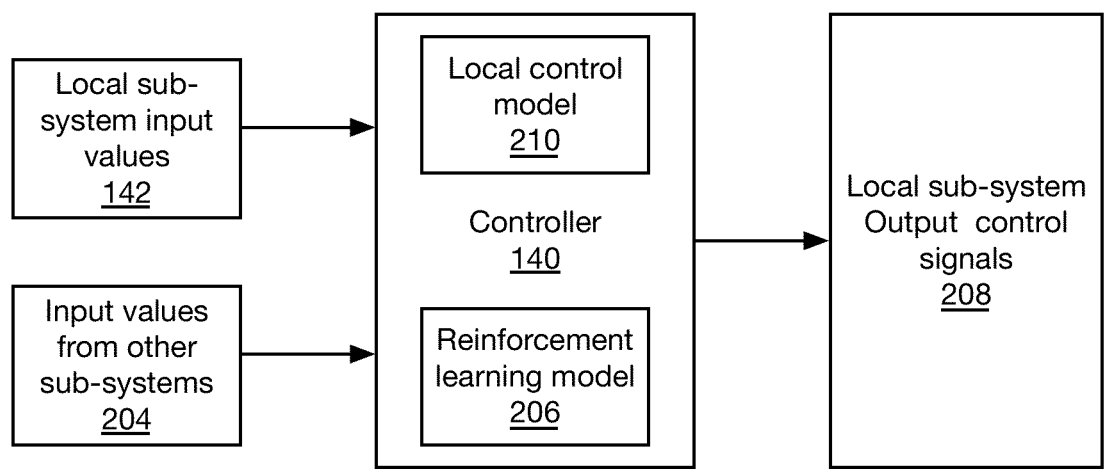
FIG. 2 is a schematic diagram of a controller in a food packaging machine, in accordance with one embodiment

These events can be represented by a set of remote variables, whose values represent various states at different sub-systems of the food packaging machine. This is schematically illustrated in FIG. 2, which shows how the input from the registration sensor 142 of the local jaw sub-system is input to the controller 140 along with the input values 204 from remote sub-systems of the food packaging machine.

In one embodiment, some examples of variables representing physical parameters from the local jaw sub-system include:
  Synchronization marks printed on the packaging material.
  A jaw system motion profile (i.e., stored motion data describing the movement of the jaw system over a period of time, for example, by logging the movement of a servo motor controlling the jaw system in a PLC (Programmable Logic Controller)).

A physical position of the mechanical forming adjustment tools (this position may change, e.g., based on the particular kind of packages being produced by the food packaging machine).

In one embodiment, some examples of variables representing physical parameters from the remote sub-systems include:

Web movement and control variables representing, e.g., detection of splices or size of packages, etc.

Web tension variables representing, e.g., positions and/or pressures on various rollers in the food packaging machine as the web travels through the food packaging machine, Filling state, e.g., filling flow and product level.

Packaging material characteristics variables, e.g., packaging material stiffness, presence of closures, package volume, etc.

As can be realized, these are merely a few examples of possible influencing factors from remote sub-systems, and should not be considered as an exhaustive list. However, they do represent influencing factors which cannot be considered by conventional control systems used today. The local and remote variables all affect the tube position in their own way, and it is difficult or impossible for conventional control systems to determine how various possible combinations of these remote and local variables should influence the operation of the local jaw sub-system.

In accordance with the various embodiments described herein, the controller 140 uses a local control model 210 to process the local sub-system input variables 142, in combination with a reinforcement learning model 206 to process the input values from the remote sub-systems, to determine how the measured variables collectively influence the operation of the local jaw sub-system. The local control model 210 can be an algorithm executed by a PID controller. The reinforcement learning model can be a deep reinforcement learning model, which includes one or more neural networks, as described above. In some embodiments, the local sub-system input variables 116 can be processed by the reinforcement learning model 206. In some embodiments, the reinforcement learning model 206 can be used to figure out how different combinations of local and remote variables should influence the web tension sub-system and use this insight to improve the local control model 210. Based on the result of this processing and determination, the controller 140 generate a set of output control signals 208 for the local jaw system 120, which control the timing of the sealing jaws of the two subassemblies and their movement into engagement with the moving tube 112 for the formation of the transverse seal.

Examples of neural networks that can be used in embodiments that use a deep reinforcement learning model include, for example, a Convolution Neural Network (CNN) that has been trained using reinforcement learning and deep reinforcement learning, a Recurrent Neural Network (RNN), such as a Long Short-Term Memory (LSTM) neural network, which is often used in the field of deep learning, or a Fully Connected Neural Network. The LSTM network may be particularly useful since, unlike standard feedforward neural networks, the LSTM has feedback connections. This enables the LSTM to process not only single data points, but also entire sequences of data, which can be particularly useful in the context of a food packaging machine designed to generate a large number of packages.

Thus, if the velocity of the moving tube 112 varies, for example, due to changes in tension in the tube, or due to imprecise functioning of one or more mechanical elements of the filling machine, the data driven approach allows the controller 140 to detect such variance in velocity of the tube and adjust the position of the registered sealing jaws to ensure that the sealing jaws engage the tube at a proper time, thereby avoiding misalignments with respect to the design of the individual packages. As a result, the food packaging machine can operate more efficiently and fewer packages need to be discarded, compared to existing solutions which may not be able to take such variables into account, resulting both in financial and environmental advantages.

Furthermore, in some embodiments, the output from the reinforcement learning model can be used to tune the gains of a conventional PID controller, such that the PID controller can operate more efficiently compared to the conventional control techniques where the PID controller relies on local variable values only. Thus, embodiments of the invention can be beneficial even in situations where the only means for controlling the jaw sub-system is a PID controller. Further, as a result of the flexibility of the present system to position the sealing jaws as a function of the variables collected from the different sub-systems of the food packaging machine, among other things, the present system may be employed to produce any of a variety of package sizes without requiring any mechanical changes to the system.

It should be noted that even though a sub-system has been referred to above as a jaw system, a filling system, a sterilizing system, a package folding system, etc. it can also refer to a portion of the above-mentioned sub-systems, or individual elements.

It should be noted that in some embodiments, the control models for the controller 140 can reside within the controller 140 itself, as illustrated in FIG. 1. In other embodiments, they may reside in and operate from external hardware/software (e.g., an external computer or similar processing equipment) to further accelerate the required computations and the controller 140 in the food packaging machine may be a simpler controller that merely executes the functionality, as determined by the external hardware/software.

The systems and methods disclosed herein can be implemented as software, firmware, hardware or a combination thereof. In a hardware implementation, the division of tasks between functional units or components referred to in the above description does not necessarily correspond to the division into physical units; on the contrary, one physical component can perform multiple functionalities, and one task may be carried out by several physical components in collaboration.

Certain components or all components may be implemented as software executed by a digital signal processor or microprocessor, or be implemented as hardware or as an application-specific integrated circuit. Such software may be distributed on computer readable media, which may comprise computer storage media (or non-transitory media) and communication media (or transitory media). As is well known to a person skilled in the art, the term computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, optical or magnetic storage devices, or any other medium which can be used to store the desired information, and which can be accessed by a computer.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

From the description above follows that, although various embodiments of the invention have been described and shown, the invention is not restricted thereto, but may also be embodied in other ways within the scope of the subject-matter defined in the following claims.

The invention claimed is:

1. A method for producing individual packages filled with one or more food products in a food packaging machine, the method comprising:
   receiving one or more local variable values indicating measurements by the food packaging machine of local one or more physical parameters for a local sub-system of a plurality of local sub-systems;
   receiving one or more remote variable values indicating measurements by the food packaging machine of one or more physical parameters for one or more remote sub-systems;
   determining one or more control parameter values for the local sub-system, by processing the local variable values using a local control model;
   updating the one or more control parameter values for the local sub-system, by processing the remote variable values using a reinforcement learning model;
   adjusting one or more control parameters of the local sub-system in accordance with the determined control parameter values; and
   controlling a formation of the individual packages by the food packaging machine in accordance with the adjusted one or more control parameters.

2. The method according to claim 1, wherein the reinforcement learning model comprises a deep reinforcement learning model including a neural network.

3. The method according to claim 2, wherein the neural network comprises one of: a convolution neural network, a recurrent neural network, a Long Short-Term Memory neural network, or a fully connected neural network.

4. The method according to claim 1, wherein the local sub-system comprises a jaw configured to form the individual packages from a tube of packaging material filled with the food product.

5. The method according to claim 4, wherein adjusting the one or more control parameters of the jaw comprises adjusting one or more of: a timing of a sealing jaws' engagement with the tube of packaging material to form the individual packages or a position of the sealing jaws' engagement with the tube of packaging material to form individual packages.

6. The method according to claim 4, wherein adjusting the one or more control parameters of the jaw facilitates production of a different form factors of the individual packages by the food packaging machines without requiring mechanical changes to the jaw.

7. The method according to claim 1, wherein:
   the one or more local variables comprises measurements relating to one or more of: synchronization marks printed on a packaging web, a jaw system motion profile or a physical position of mechanical forming adjustment tools, and
   the one or more remote variable values comprises measurements relating to one or more of: packaging web movement and control variables, packaging web tension variables, packaging filling state variables or packaging material.

8. A computer program product comprising a non-transitory computer readable storage medium with instructions that, when executed to a processor, cause the processor to carry out the method according to claim 1.

9. The method according to claim 1, wherein the reinforcement learning model updates the one or more control parameter values based on a control policy, the control policy being based on positive rewards when the remote variable values reach a target value and based on negative rewards when the remote variable values do not reach the target value.

10. The method according to claim 1, wherein the reinforcement learning model processes the remote variable values and the local variable values to update the one or more control parameter values for the local sub-system.

11. A food packaging machine comprising:
   a plurality of local sub-systems configured to produce individual packages filled with one or more food products;
   a memory; and
   a processor,
   wherein the memory stores instructions that, when executed by the processor, cause the processor to perform a method comprising:
      receiving one or more remote variable values indicating measurements by the food packaging machine of one or more physical parameters for one or remote sub-systems;
      receiving one or more local variable values indicating measurements by the food packaging machine of one or more physical parameters for a local sub-system of the plurality of local sub-systems;
      determining one or more control parameter values for the local sub-system, by processing the local variable values using a a local control model;
      updating the one or more control parameter values for the local sub-system, by processing the remote variable values using a reinforcement learning model;
      adjusting one or more control parameters of the local sub-system in accordance with the determined control parameter values; and
      controlling a formation of individual packages by the food packaging machine in accordance with the adjusted one or more control parameters.

12. The food packaging machine according to claim 11, wherein the reinforcement learning model comprises a deep reinforcement learning model comprising a neural network.

13. The food packaging machine according to claim 12, wherein the neural network comprises one of: a convolution neural network, a recurrent neural network, a Long Short-Term Memory neural network, or a fully connected neural network.

14. The food packaging machine according to claim 11, wherein the local sub-system comprises a jaw configured to form the individual packages from a tube of packaging material filled with the food product.

15. The food packaging machine according to claim 14, wherein adjusting the one or more control parameters of the jaw comprises adjusting one or more of: a timing of a sealing jaws' engagement with the tube of packaging material to form the individual packages, or a position of the sealing jaws' engagement with the tube of packaging material to form individual packages.

16. The food packaging machine according to claim 14, wherein adjusting the one or more control parameters of the jaw facilitates production of a different form factors of the individual packages by the food packaging machines without requiring mechanical changes to the jaw.

17. The food packaging machine according to claim 11, wherein:
- the one or more local variables comprises measurements relating to one or more of: synchronization marks printed on a packaging web, a jaw system motion profile, or a physical position of mechanical forming adjustment tools, and
- the one or more remote variable values comprises measurements relating to one or more of: packaging web movement and control variables, packaging web tension variables, packaging filling state variables, and packaging material.

* * * * *